United States Patent [19]

Fukui et al.

[11] Patent Number: 4,692,034
[45] Date of Patent: Sep. 8, 1987

[54] ELECTRONIC THERMOMETER

[75] Inventors: Ryoichi Fukui, Matsuzaka; Susumu Minamikawa, Ise, both of Japan

[73] Assignee: Omron Tateisi Electronics Co., Kyoto, Japan

[21] Appl. No.: 809,034

[22] Filed: Dec. 16, 1985

[30] Foreign Application Priority Data

Dec. 17, 1984 [JP] Japan ................... 59-264442

[51] Int. Cl.⁴ ............... G01K 1/08; G01K 1/14; G01K 7/00
[52] U.S. Cl. .................. 374/208; 374/170; 242/96
[58] Field of Search .......... 374/170, 208, 136, 183; 340/596, 586; 338/196; 242/96, 84.1 M

[56] References Cited

U.S. PATENT DOCUMENTS

| | | | |
|---|---|---|---|
| 1,523,557 | 1/1925 | Pacent ................... | 338/196 |
| 2,290,328 | 7/1942 | Hedfield et al. .......... | 374/208 |
| 3,078,058 | 2/1963 | Roe ...................... | 242/96 |
| 3,087,338 | 4/1963 | Horbinski et al. ......... | 374/137 |
| 3,721,124 | 3/1973 | Franks ................... | 374/137 |
| 3,857,285 | 12/1974 | Athey et al. ............. | 374/208 |
| 3,946,613 | 3/1976 | Silver ................... | 374/208 |
| 4,095,467 | 6/1978 | McGlynn .................. | 374/170 |
| 4,104,917 | 8/1978 | Rieth et al. ............. | 374/170 |
| 4,487,208 | 12/1984 | Kamens ................... | 374/170 |
| 4,588,307 | 5/1986 | Palti .................... | 374/208 |

Primary Examiner—Charles Frankfort
Assistant Examiner—Thomas B. Will
Attorney, Agent, or Firm—Wegner & Bretschneider

[57] ABSTRACT

An electronic thermometer comprises a casing, an electric cord capable of being accommodated within the casing so as to be pulled outwardly as desired, a temperature sensing probe mounted at a free end of the cord, and a main body of the thermometer mounted within the casing rotatably with a display field being exposed through the casing, wherein a base end portion of the cord extends outwardly from the peripheral portion of the main body in such a manner in which the main body serves also as a reel for winding the cord therearound. The case is configured in a thin box-like structure and having a probe holding portion formed on one side thereof for removably storing the probe. Reliable electric connection and improved portability of the thermometer is realized.

5 Claims, 4 Drawing Figures

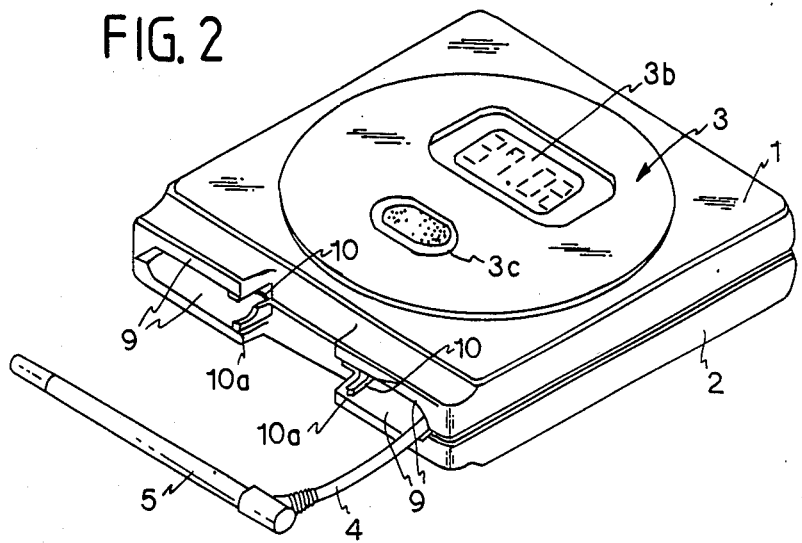
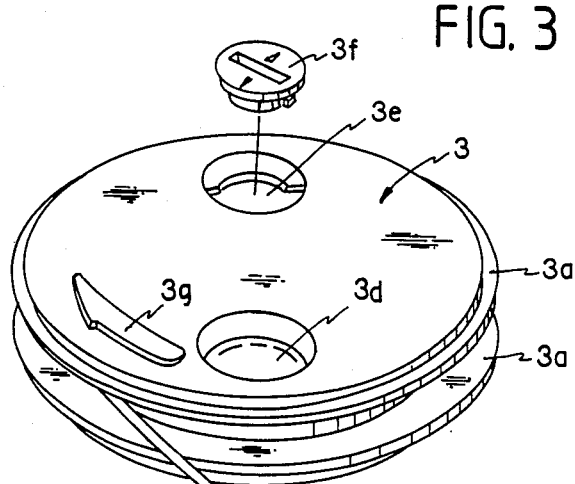
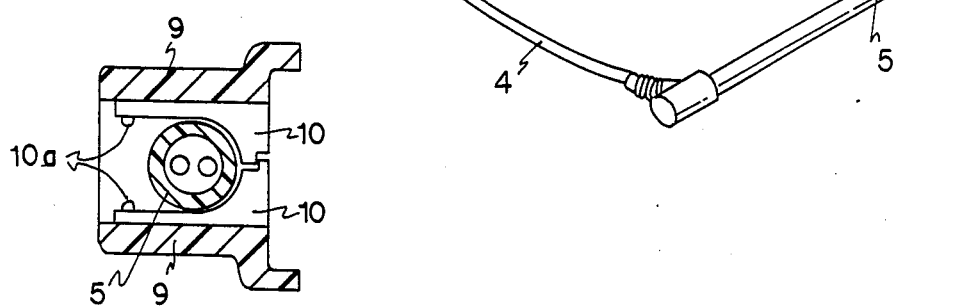

ELECTRONIC THERMOMETER

BACKGROUND OF THE INVENTION

1. Field of the Invention

The present invention relates to an electronic thermometer suited particularly for use as a ladies' clinical thermometer.

2. Description of the Prior Art

There has been known an electronic thermometer destined particularly for use as the ladies' thermometer with includes a thermometer main body incorporating an electronic processing circuit and a display field, and a temperature sensing probe electrically connected to the main body by a cable. In use of the thermometer, the temperature sensing probe must be held under the tongue of user while she is observing the display. Accordingly, the connecting cable is necessary of a relatively great length. Since the connecting cable or cord presents an obstacle when the thermometer is not used, it is desirable to equip the thermometer main body with a reel for winding the cable or cord.

However, equipment of the thermometer body with the cord reel brings about another problem that the electrical connection between the terminals of the cord and the thermometer main body must be realized in the form of mechanical contact, e.g. by using contact brushes, possibly giving rise to electrical loss degradation in the accuracy of measurement. Besides, incorporation of the cord reel in the thermometer main body means that the space within the casing of the thermometer main body is occupied by the cord reel, as the result of which the space available for accommodating the electronic/electric circuit of the thermometer is restricted. As the consequence, a casing of an increased size will have to be used, to another disadvantage.

SUMMARY OF THE INVENTION

It is therefore an object of the present invention to provide an electronic thermometer imparted with a cord or cable winding function, in which main body of the thermometer and the cord or cable can be connected directly by soldering, for example, while the casing of the thermometer can be realized in a reduced size.

In view of the above and other objects which will become more apparent as description proceeds according to an aspect of the invention an electronic thermometer which comprises a case, a cord (cable) accommodated within the case to be readily pulled or drawn outwardly, a temperature sensing probe provided at the free end of the cord, and a main body having a display field exposed through the case surface and held rotatably within the case, wherein the main body is so configured as to serve also as a reel for winding the cord therearound.

With the structure of the thermometer according to the invention, the cord can be electrically connected to the electric/electronic circuit of the thermometer body directly, e.g. by soldering without resoring to the use of mechanical connection, whereby the accuracy of measurement as well as reliability can be significantly improved. Further, the number of parts as required can be reduced as compared with the hitherto known thermometer, leading to low manufacturing cost.

Additionally, by virtue of the possibility of realizing the casing in a miniaturized size, the value of the thermometer as an article of commerce is enhanced. More specifically, this sort of ladies' thermometer requires in addition to the practicality or utility as the measuring instrument a portability typified by light weight and size as well as certain fashionability. The electronic thermometer according to the present invention can meet these requirements to satisfactory extent.

The above and other objects, features and advantages of the invention will be more apparent upon consideration of the following detailed description of the preferred embodiments.

The description makes reference to the accompanying drawings.

BRIEF DESCRIPTION OF THE DRAWINGS

FIG. 2 is a perspective view showing the same in the assembled state;

FIG. 3 is a perspective view showing a main body of the thermometer in the upset state; and FIG. 4 is a sectional view showing a probe mounted on a probe holder.

DESCRIPTION OF THE PREFERRED EMBODIMENTS

Figure 1:
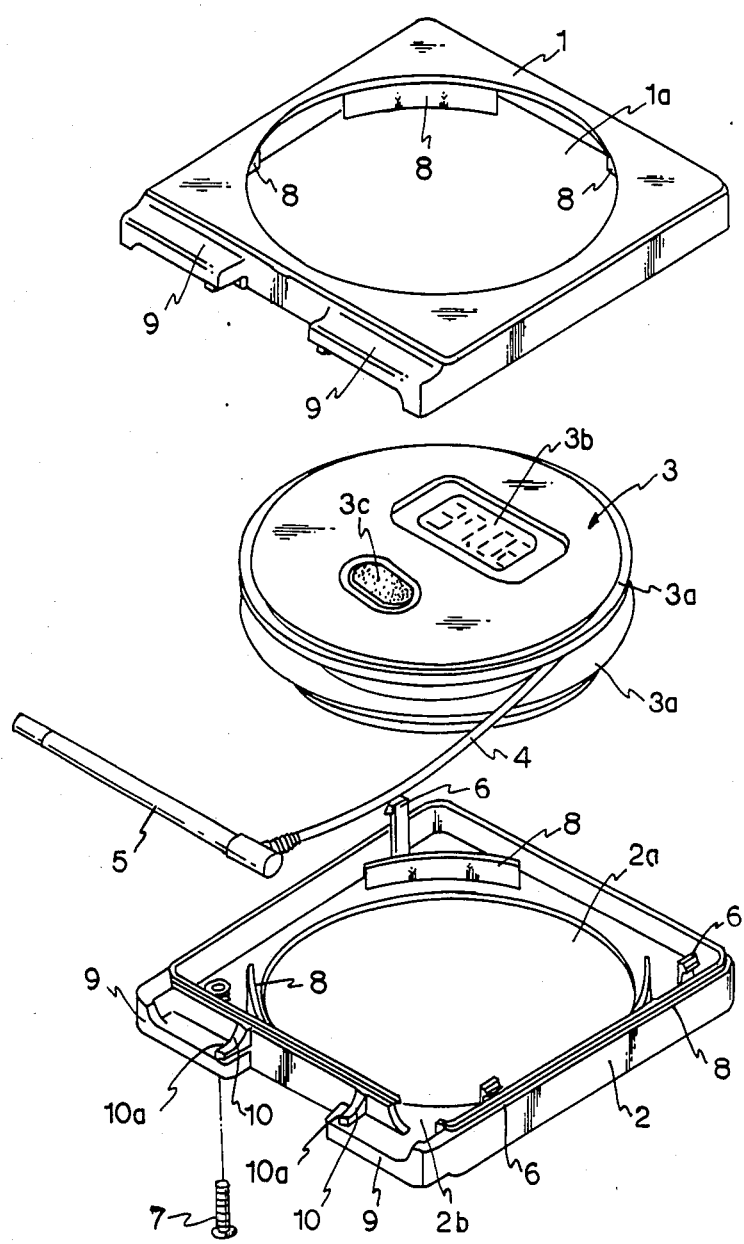
FIG. 1 is an exploded perspective view showing a ladies' clinical therometer according to an exemplary embodiment of the present invention.

Now, the invention will be described in detail by first referring to FIGS. 1 and 2 which show a ladies' clinical thermometer according to an embodiment of the invention in an exploded state and the assembled state, respectively.

Referring to the figures, the illustrative ladies' clinical thermometer includes a box-like flat casing composed of a top casing member 1 and a bottom casing member 2, a main body 3 of the clinical thermometer held between the top and the bottom casing members 1 and 2, an electrical connecting cord (or cable) 4 adapted to be wound around the outer peripheral portion of the main body 3, and a temperature sensing probe 5 mounted on the free end of the cord 4 in a L-like fashion.

Each of the top and bottom casing members 1 and 2 is of a square shape and has a reduced thickness or depth. It will be noted that openings 1a and 2a are formed in the top and bottom casing members 1 and 2, respectively, so that the top and bottom surfaces of the thermometer main body 3 can be exploded through these openings.

The bottom casing member 2 is provided with three upstanding claws 6 along the peripheral wall with predetermined distances. On the other hand, the top casing half 1 may be provided with recesses or notches at positions corresponding to the retaining members 6. By fitting together the top and bottom casing halves 1 and 2 with the retaining members 6 being received in the associated recesses, respectively, and fastening both by means of a screw or bolt 7, the casing is completed.

The main body 3 of the thermometer is in the form of a thin disc having a pair of parallel flanges 3a formed close to and along the top and bottom peripheral edges of the main body so that the flanges bear on the inner peripheral edge portions of the openings 1a and 2a, respectively. In this manner, the thermometer main body can be rotatably held between the assembled top and bottom casing halves 1 and 2.

In this connection, it should be mentioned that a plurality of guide rails 8 may be provided within the top and bottom casing halves at such a position that they are brought into contact with the peripheral edges of the flanges 3a, respectively for assuring smooth rotation of the main body 3.

The flexible cable or cord 4 has a base end portion fixedly secured internally of the main body 3 and is pulled outwardly. The electrical conductors of the cord can be directly connected to the electronic circuit appropriately by soldering, by way of example.

It will further be seen that a display 3b and a switch 3c is disposed on the top surface of the thermometer main body 3. On the other hand, the bottom surface is provided with a finger hole 3d for receiving a finger to rotate the main body 3 and a battery hole 3e for receiving therein a battery 3f. Additionally, an arrow 3g indicating the direction for rotating the main body 3 to wind up the cord 4 is formed in the bottom surface.

Notches 2b forming an opening through which the cord 4 is pulled out or withdrawn are provided in the side walls of the top and bottom casing halves, respectively, (only the notch formed in the bottom casing half is shown). On one side of the casing, there is integrally formed probe holder portions 9 extending laterally and each having a pair of U-like integral ridges 10 each of which in turn has a retaining projection 10a. By virtue of this structure, the probe 5 stored within the probe holder, as illustrated in FIG. 4, is prevented from inadvertently dropping outwardly by means of the retaining projections 10a.

For taking out the probe 5 from the holder 9, it is sufficient to apply a pulling force to the probe 5 by a finger for overcoming the obstacle provided by the projections 10a.

Then, the cord 4 can be easily drawn outwardly by exerting a pulling force of small magnitude to a desired length because of rotation of the disc 3.

For withdrawing or storing the code 4 within the casing, a finger is placed in the hole 3d formed in the bottom surface of the disc 3 to rotate the latter in the direction indicated by the arrow.

In the completely stored state of the cord, the temperature sensing probe 5 is positioned substantially in parallel with the probe holder 9. Accordingly, by pressing by a finger the probe to the interior of the holder 9 beyond the projections 10a, the probe 5 can be stored within the holder 9.

In the foregoing, the invention has been described in conjunction with the illustrative embodiment thereof. It should however be understood that the invention is never restricted to it. Various modifications and changes in design will readily occur to those skilled in the art without departing from the spilit and scope of the invention set forth in the annexed claims.

What is claimed is:

1. An electronic thermometer, comprising:
   a casing;
   an electric cord accommodated within the casing so as to be pulled outwardly as desired;
   a temperature sensing probe mounted at a free end of the cord;
   a main body which houses the thermometer rotatably mounted within the casing with a display field being exposed through said casing, wherein
   a base portion of said cord connected to the thermometer housed in the main body and which extends outwardly from a peripheral portion of said main body in such a manner in which said main body serves also as a reel for winding said cord therearound; and
   a probe holder integral to the casing for accommodating the probe within a peripheral portion of the casing being located on at least one side of the casing, and wherein the main body which houses the thermometer contains a display means with the display field for showing a temperature value, a battery for supplying power to the electronic thermometer and an electronic circuit for processing the temperature value.

2. An electronic thermometer according to claim 1, wherein,
   the casing is composed of a first casing half and a second casing half which are assembled together oppositely to each other to form a flat-box like configulation.

3. An electronic thermometer according to claim 2, wherein the main body which houses the thermometer is in the form of a thin disc having a pair of flanges formed adjacent upper and lower edges of the disc, respectively, to constitute the reel, and the first and second casing halves having apertures passing therethrough for accommodating the upper and lower edges of the disc, respectively.

4. An electronic thermometer according to claim 3, wherein,
   the electronic circuit processes signals derived from the probe to thereby determine the temperature value and display the temperature value at the display field.

5. An electronic thermometer according to claim 4, wherein
   the main body has a hole formed in a surface for receiving a finger to rotate the main body upon withdrawing the cord and an arrow indicating the direction in which the main body is to be rotated, and wherein the flanges of the main body are seated on inner surfaces along the apertures of the first and second casing halves, respectively.

* * * * *